B. D. NORTHRUP.
FRICTION CLUTCH.
APPLICATION FILED DEC. 24, 1908.

975,987.

Patented Nov. 15, 1910.

2 SHEETS—SHEET 1.

WITNESSES
R. A. Balderson
G. L. Winters

INVENTOR
B. D. Northrup,
by Bakewell, Byrnes & Parmelee,
his Attys.

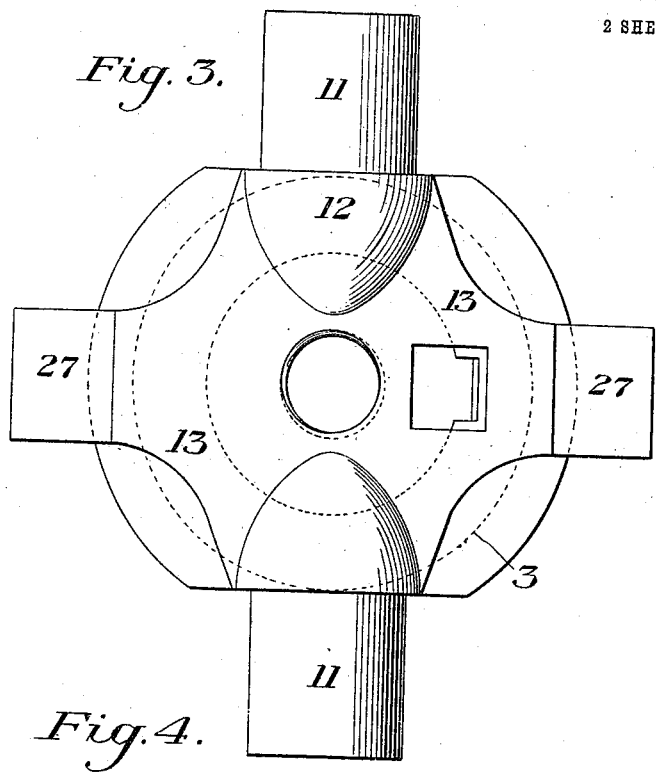
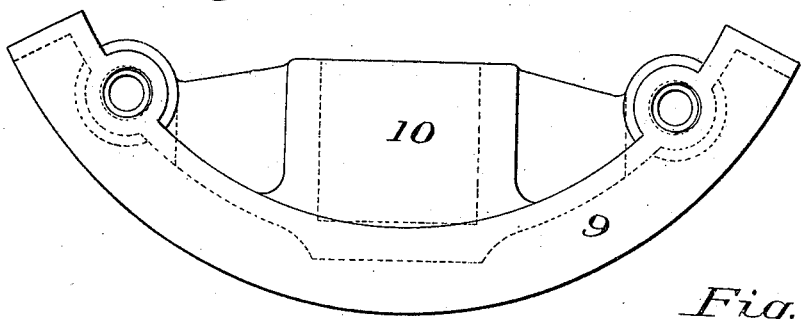
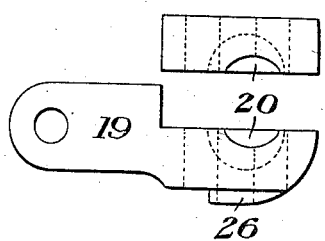

UNITED STATES PATENT OFFICE.

BLANCHER D. NORTHRUP, OF WASHINGTON, PENNSYLVANIA.

FRICTION-CLUTCH.

975,987.

Specification of Letters Patent.

Patented Nov. 15, 1910.

Application filed December 24, 1908. Serial No. 469,183.

*To all whom it may concern:*

Be it known that I, BLANCHER D. NORTHRUP, of Washington, Washington county, Pennsylvania, have invented a new and useful Friction-Clutch, of which the following is a full, clear, and exact description, reference being had to the accompanying drawings, forming part of this specification, in which—

Figure 1:
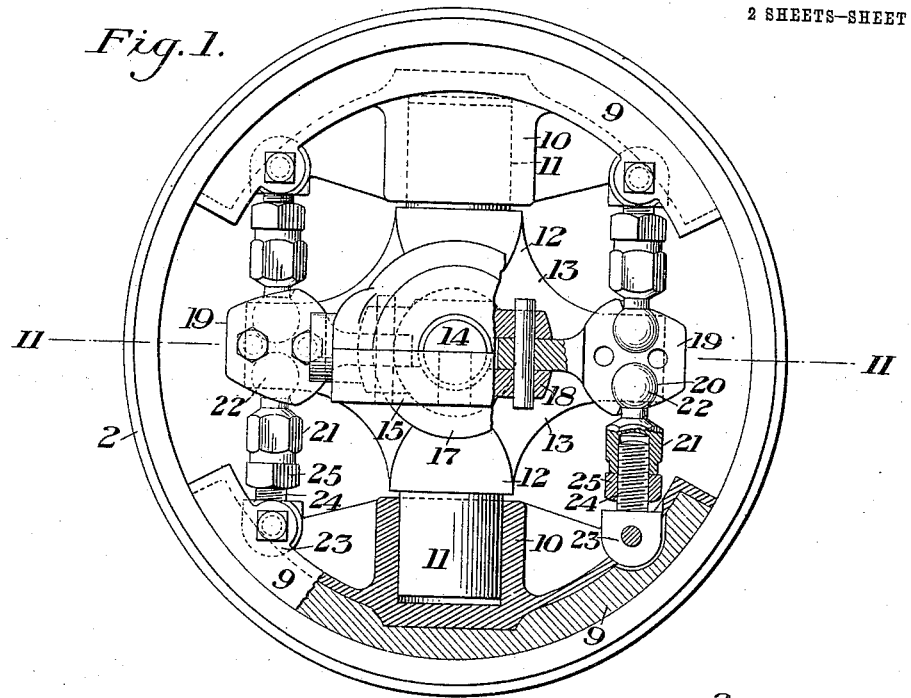
Figure 2:
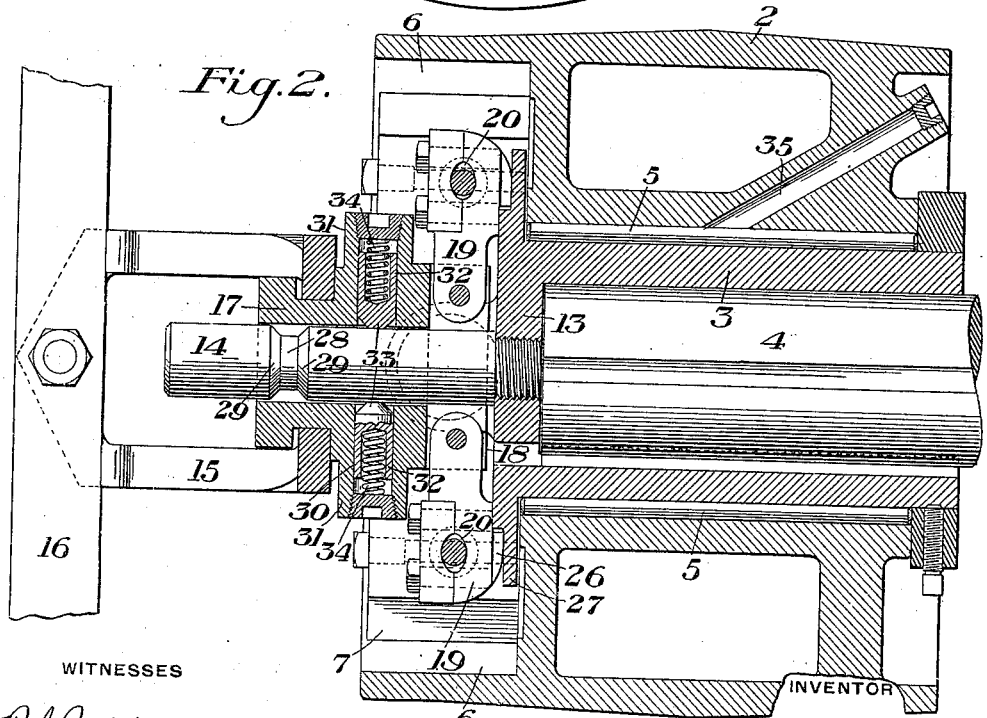

Figure 1 is a view partially in end elevation and partially in section of one form of clutch embodying my invention; Fig. 2 is a section on the line II—II of Fig. 1; and Fig. 3 is a detail view of one member of the clutch; Fig. 4 is a detail view of one of the shoes; and Figs. 5 and 6 are detail views showing the toggle members.

My invention has relation to the class of friction clutches, and is designed to provide a simple and efficient form of clutch which is capable of transmitting a large amount of power, and in which the parts are so constructed and arranged as to provide a strong and durable construction.

The nature of my invention will be best understood by reference to the accompanying drawings, in which I have shown the preferred embodiment thereof, and which will now be described, it being premised, however, that various changes may be made in the details of construction and arrangement of parts without departing from the spirit and scope of my invention as defined in the appended claims.

In these drawings, the numeral 2 designates the pulley member of the clutch, which is loosely mounted upon the sleeve or bushing 3 keyed or otherwise rigidly secured to the shaft 4. Either the shaft 4 with the sleeve or bushing 3, or the pulley member 2, may be the driving member of the clutch. In the following description it will be assumed that the shaft 4 is the driving member, and that the pulley 2 is the driven member. Roller or other suitable anti-friction bearings 5 are preferably interposed between the pulley 2 and the sleeve or bushing 3. The pulley member is interiorly cut away or chambered at its outer end portion, as indicated at 6, to receive the friction clutch shoes 7, which are of arcuate form, and which are designed to have frictional contact with the outer peripheral walls of the chamber 6. These shoes are provided with central socket portions 10, which are loosely engaged by studs 11 at the ends of the diametrically opposite radial arms 12 of a hub member 13, which is preferably integral with and forms an extension of the sleeve member 3 within the chamber 6.

The shaft 4 is provided with an extension 14, which is shown as consisting of a separate piece of reduced diameter threaded into the outer end of the sleeve 3 and extending centrally through the hub 13. Mounted on this extension 14 to slide endwise thereon under the action of a yoke 15, and shifting lever 16, is a shifting sleeve 17. Pivoted in arms 18 at the inner end of the member 17 are the toggle arms 19, which are formed with the ball sockets 20.

21 are toggles having ball ends 22, which fit loosely in the sockets 20, and which are pivotally connected at their outer ends at 23 to the friction shoes 9. These toggles are preferably made in two parts having an adjustable connection as indicated at 24, whereby their length can be adjusted, jam nuts 25 being provided for the purpose of securing this adjustment.

It will be seen that the arms 19, together with the connections 21, constitute a double toggle arrangement which, as the sleeve 17 is reciprocated on the shaft extension 14, acts upon the friction shoes 9 to either force such shoes outwardly into driving contact with the pulley 2, or to retract the shoes from driving engagement. The inward movement of the toggle arms 19 is limited by the stop projections 26 on said arms coming into engagement with the arms 27 of the clutch member 13. This double toggle arrangement, as will be readily seen, forms an actuating connection for the friction shoes, which is very powerful in its action, and whereby the shoes may be so tightly set in engagement with the pulley as to prevent slippage and the consequent loss of power and wear.

When, as has been assumed herein, the shaft 4 constitutes the driving member, and the pulley 2 the driven member, it is desirable to provide means which will effectually prevent the friction shoes 10, when the clutch is released, from being thrown outwardly by the centrifugal force of rotation, into contact with the pulley, since any action of this kind results in rapid wearing of the shoes. To prevent this action, I have shown the shaft extension 14 as having a circumferential groove 28 formed therein. The side walls 29 of this groove are preferably sloped outwardly at an angle of about 45 degrees. Seated in pockets 30, formed in projecting arms 31 of the shifting sleeve 17, are pins 32 having conical end portions 33 which are designed to engage the groove 28 when the clutch is thrown out, the pins being pressed into such engagement by means of springs 34. As soon as the clutch is thrown out, these pins are pressed into the groove 28 and effectively prevent any endwise movement of the shifting sleeve 17 by reason of the centrifugal force of rotation of the shoes, so that the shoes are positively held out of rubbing contact with the pulley member. When the shifting lever 16 is actuated to throw the clutch in, the cone-shaped ends of the pins will readily ride up the sloping inner wall of the groove 28.

35 indicates a passage or aperture formed in the pulley member 2, for the purpose of introducing lubricant to the roller bearings 5.

The advantages of my invention result from the provision of the double toggle devices for actuating the friction shoes, whereby a power leverage is obtained in setting the shoes, and which constitute a strong and durable connection for transmitting the driving strains. It will be readily seen that these toggle devices are of such character that while they are tightly set while in action, a comparatively slight movement of the shifting sleeve 17 will effect the release of the shoes. It will be noted that when the shoes are set, the toggle members 21 are straightened out into line with each other, and that the relation of their center lines is such as to lock them in this position against any tendency to release the shoes.

The provision of the locking devices for preventing the shoes from being thrown outwardly by centrifugal force into wearing contact with the pulley when the clutch is out of operation, is of great advantage when the shaft forms the driving member. Where the clutch is used with an intermittently driven shaft and a constantly driven pulley member, this feature may, of course, be omitted, since there is no centrifugal force acting on the shoes 9 to throw them into rubbing contact with the pulley when the shaft is at rest.

Various changes may be made in the construction and arrangement of the parts. Thus, the shifting sleeve may be variously constructed and arranged, together with the means for actuating the same; the construction of the pulley member and the manner of mounting the same upon the shaft may be varied, and changes may be made in the details of construction of the toggle mechanism for actuating the shoes, and of the shoes themselves.

What I claim is:—

1. A friction clutch, a shaft, a sleeve member mounted on the shaft and fixed thereto, a pulley rotatably mounted on the sleeve member, said pulley having a chambered end portion extending beyond one end of the sleeve member, and the sleeve member having a hub portion lying within said chambered portion and provided with radially extending studs, radially movable friction shoes mounted on said studs and arranged to be moved into and out of driving engagement with the pulley, a longitudinally movable shifting member mounted on an extension of the shaft, toggle arms pivoted to said member, and a pair of toggles pivoted at one end to the said arms and at their other ends to the shoes, substantially as described.

2. A friction clutch, a shaft, a sleeve member mounted on the shaft and fixed thereto, a pulley rotatably mounted on the sleeve member, said pulley having a chambered end portion extending beyond one end of the sleeve member, and the sleeve member having a hub portion lying within said chambered portion and provided with radially extending studs, radially movable friction shoes mounted on said studs and arranged to be moved into and out of driving engagement with the pulley, a longitudinally movable shifting member mounted on an extension of the shaft, toggle arms pivoted to said member, and a pair of toggles pivoted at one end to the said arms and at their other ends to the shoes, the toggle arms and the hub portion having coöperating stop portions, substantially as described.

3. A friction clutch, a shaft, a sleeve member mounted on the shaft and fixed thereto, a pulley rotatably mounted on the sleeve member, said pulley having a chambered end portion extending beyond one end of the sleeve member, and the sleeve member having a hub portion lying within said chambered portion and provided with radially extending studs, radially movable friction shoes mounted on said studs and arranged to be moved into and out of driving engagement with the pulley, a longitudinally movable shifting member mounted on an extension of the shaft, toggle arms pivoted to said member, and a pair of toggles pivoted at one end to the said arms and at their other ends to the shoes, said shaft extension having a circumferential groove therein within the shifting member, said groove having beveled side walls, and the shifting member
5 having a spring-pressed pin or dog arranged to enter said groove in one position of the shifting member, substantially as described.

In testimony whereof, I have hereunto set my hand.

B. D. NORTHRUP.

Witnesses:
   H. M. CORWIN,
   GEORGE H. PARMELEE.